US008539860B2

(12) United States Patent
Waseda

(10) Patent No.: US 8,539,860 B2
(45) Date of Patent: Sep. 24, 2013

(54) SHAFT APPARATUS WITH BEARING

(75) Inventor: Yoshitaka Waseda, Nisshin (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/064,353

(22) Filed: Mar. 21, 2011

(65) Prior Publication Data

US 2011/0197702 A1    Aug. 18, 2011

Related U.S. Application Data

(62) Division of application No. 12/292,735, filed on Nov. 25, 2008, now abandoned.

(30) Foreign Application Priority Data

| Nov. 27, 2007 | (JP) | ................................. 2007-305794 |
| Feb. 13, 2008 | (JP) | ................................. 2008-031589 |
| Feb. 13, 2008 | (JP) | ................................. 2008-031590 |
| Mar. 26, 2008 | (JP) | ................................. 2008-080599 |

(51) Int. Cl.
    *F16C 3/04*    (2006.01)
(52) U.S. Cl.
    USPC ........................................................ 74/595
(58) Field of Classification Search
    USPC ................ 74/567, 595; 123/197.4; 384/428, 384/434
    See application file for complete search history.

(56) References Cited

U.S. PATENT DOCUMENTS

| 2,682,435 | A | * | 6/1954 | Rien et al. ..................... 384/562 |
| 2,697,403 | A | * | 12/1954 | Benedek ....................... 417/439 |
| 3,248,155 | A | | 4/1966 | Schaeffler |
| 3,307,891 | A | | 3/1967 | Carullo |
| 3,792,624 | A | | 2/1974 | Pitner |
| 2,703,738 | A | | 3/1995 | Palmgren et al. |
| 6,176,623 | B1 | | 1/2001 | Zeigler |
| 7,172,352 | B2 | * | 2/2007 | Close et al. .................. 400/625 |
| 7,828,485 | B2 | | 11/2010 | Waseda et al. |

(Continued)

FOREIGN PATENT DOCUMENTS

| DE | 923 760 C | 2/1955 |
| DE | 19926406 A1 * | 12/2000 |

(Continued)

OTHER PUBLICATIONS

European Search Report dated Mar. 16, 2009.

*Primary Examiner* — Vicky Johnson
(74) *Attorney, Agent, or Firm* — McGinn IP Law Group, PLLC

(57) ABSTRACT

A bearing apparatus for including a camshaft, a plurality of cam blocks disposed in an axial direction on the camshaft, a housing member including an arc concave portion, a cap member which is fixed to the housing and includes an arc concave portion, a roller bearing interposed between the arc concave portion of the housing member and the arc concave portion of the cap member so as to rotatably support the camshaft, and annular first and second control rings which are separately provided from the camshaft, and are press-fitted and fixed to an outer surface of the camshaft at opposite side portions of the roller bearing in the axial direction. Surfaces of the first and second rings that face each other are formed as slide surfaces, and the slide surfaces come in contact with opposite side surfaces of at least one of the housing member and the cap member to receive an axial load.

8 Claims, 12 Drawing Sheets

(56) References Cited

U.S. PATENT DOCUMENTS

| | | |
|---|---|---|
| 2005/0084192 A1 | 4/2005 | Takeo et al. |
| 2008/0289592 A1 | 11/2008 | Flender et al. |
| 2010/0147104 A1 | 6/2010 | Ueno et al. |

FOREIGN PATENT DOCUMENTS

| | | |
|---|---|---|
| DE | 10 2006 036 851 A1 | 6/2007 |
| EP | 1 995 417 A1 | 11/2008 |
| FR | 1518002 A | 3/1968 |
| FR | 2 506 869 A | 12/1982 |
| FR | 2 913 720 A1 | 9/2008 |
| JP | 4-99420 | 8/1992 |
| JP | 8-74523 A | 3/1996 |
| JP | 9-242511 A | 9/1997 |
| JP | 2000-320646 A | 11/2000 |
| JP | 2003-222226 A | 8/2003 |
| JP | 2004-316671 A | 11/2004 |
| JP | 2006-52775 A | 2/2006 |
| JP | 2006-226183 A | 8/2006 |
| JP | 2006-226184 A | 8/2006 |
| JP | 2007-187259 | 7/2007 |
| JP | 2007-192315 | 8/2007 |
| JP | 2007-247875 | 9/2007 |

* cited by examiner

SHAFT APPARATUS WITH BEARING

RELATED APPLICATIONS

The present application is a Divisional application of U.S. patent application Ser. No. 12/292,735 which was filed on Nov. 25, 2008 now abandoned, the disclosure of which is incorporated herein by reference.

The present disclosure relates to the subject matter contained in Japanese Patent Application No. 2007-305794 filed on Dec. Nov. 27, 2007, Japanese Patent Application No. 2008-031589 filed on Feb. 13, 2008, Japanese Patent Application No. 2008-031590 filed on Feb. 13, 2008 and Japanese Patent Application No. 2008-080599 filed on Mar. 26, 2008, which are incorporated herein by reference in their entirety.

BACKGROUND OF THE INVENTION

The present invention relates to a shaft apparatus having a shaft, blocks, and a roller bearing.

As a shaft apparatus having a shaft, blocks, and a roller bearing, for example, there is a camshaft apparatus which is rotatably mounted to a cylinder head portion of an internal combustion engine.

When the shaft apparatus is the camshaft apparatus, after a shaft, a predetermined number of cam blocks (corresponding to the blocks), and a roller bearing (for example, a bearing) using a portion of an outer surface of the shaft as an inner ring raceway surface are individually manufactured, the cam blocks and the roller bearing are disposed and fitted to the outer surface of the shaft at predetermined intervals in an axial direction.

In addition, as disclosed in JP2007-192315A and JP2007-187259A, a camshaft apparatus having a structure in which a predetermined number of cam blocks are disposed on an outer surface of a shaft in an axial direction thereof and a roller bearing which is separately provided is mounted on the outer surface of the shaft in a radial direction, is known.

However, at a normal temperature, when the roller bearings using the portion of the outer surface of the shaft as the inner ring raceway surface, and the cam blocks are fitted to the outer surface of the shaft in the axial direction thereof at predetermined intervals, press-fitting marks may be generated by press-fitting the cam blocks to the outer surface of the shaft, and this causes the degradation in performance of the roller bearing. For this reason, the outer surface of the shaft needs to be subjected to a surface treatment such as a heat treatment to obtain a desired hardness, and the roller bearing and the cam blocks are fitted thereto at predetermined intervals by performing a cold fitting. This results in cost increase.

In addition, as disclosed in JP2007-192315A and JP2007-187259A, the roller bearing has to be separately provided to be mounted on the outer surface of the shaft in the radial direction, so that manufacturing and mounting the roller bearings cannot be easily performed.

Further, when the camshaft apparatus in which the cam blocks and the roller bearing are fitted and mounted to the outer surface of the shaft in the axial direction is mounted to the cylinder head portion, in some cases, the roller bearing may unpredictably move in the axial direction of the shaft. In this case, the roller bearing has to be moved and adjusted to a predetermined position in the axial direction of the shaft, and this may cause trouble.

Therefore, a control member which is disposed at a position close to an end portion of an outer ring of the roller bearing to control unpredictable movement of the roller bearing in the axial direction has been proposed.

However, when the control member is disposed at the position close to the end portion of the outer ring of the roller bearing, during the bearing rotation, sliding resistance (friction) between the end portion of the outer ring of the roller bearing and the control member occurs, and this causes degradation in bearing performance.

In general, as a bearing apparatus for a camshaft, for example, as disclosed in JP2007-247875A, there is a bearing apparatus employing a roller bearing instead of a sliding bearing to be disposed between a housing member and a cap member on a camshaft on which a plurality of cam blocks are disposed in an axial direction, in order to reduce torque loss.

In the bearing apparatus, an outer ring of the roller bearing is divided into two portions to be engaged with an arc concave portion of the housing member and an arc concave portion of the cap member, respectively.

In addition, at a cage for refining a number of rollers, a crack is formed in a circumferential direction, so that the cage is mounted along an outer circumference of the camshaft.

In addition, an axially stepped portion for controlling the movement of the roller bearing in the axial direction is provided to the camshaft.

However, in the general bearing apparatus for a camshaft, the axially stepped portion has to be provided to the camshaft by dividing the outer ring of the roller bearing into two portions and forming the crack at the cage in the circumferential direction, so that the structure is complex.

SUMMARY OF THE INVENTION

The present invention is contrived to solve the above-mentioned problems. An object of the invention is to provide a shaft apparatus in which blocks such as cam blocks and a roller bearing can be easily mounted to an outer surface of a shaft in an axial direction thereof so as to reduce cost.

A further object of the invention is to provide a shaft apparatus capable of preventing unpredictable movement of a roller bearing in the axial direction by using a control member press-fitted and fixed to an outer surface of a shaft and reducing sliding resistance between the roller bearing and the control member.

A further object of the invention is to provide a bearing apparatus for a camshaft having a simple structure and high assemblability.

In order to solve the problems, the present invention provides the following arrangements.

(1) A shaft apparatus comprising:
 a shaft;
 blocks fitted to an outer surface of the shaft at an intervals in an axial direction;
 a roller bearing which includes an inner ring fitted and fixed to the outer surface of the shaft, an outer ring, and rollers interposed between the inner and outer rings; and
 first and second control rings which control movement of the outer ring in the axial direction of the shaft and are disposed between the shaft and the outer ring.

(2) The shaft apparatus according to claim 1, wherein at least one of the first and second control rings is formed integrally with an end portion of the inner or outer ring of the roller bearing.

(3) A shaft apparatus comprising:
 a shaft;
 blocks fitted on an outer surface of the shat at an intervals in an axial direction;
 a roller bearing which is disposed on the outer surface of the shaft, and includes an outer ring, rollers disposed between the outer surface of the shaft and the outer ring; and an annular control member press-fitted and fixed to the outer surface of the shaft at a position close to an end portion of the roller bearing, wherein at least one of end surfaces of the control member and the roller bearing which face each other, is formed as a curved surface and comes in contact with the other end surface thereof so as to control movement of the roller bearing in the axial direction.

(4) The shaft apparatus according to (3), wherein the control member is press-fitted and fixed to the outer surface of the shaft at a position close to an end surface of the outer ring of the roller bearing.

(5) The shaft apparatus according to (3), wherein the control member is press-fitted and fixed to the outer surface of the shaft at a position close to an end surface of a cage for retaining the rollers.

(6) A shaft apparatus comprising:

a shaft;

blocks fitted on an outer surface of the shaft at an interval in an axial direction;

a roller bearing which is disposed on the outer surface of the shaft, and includes an outer ring and rollers disposed between the outer surface of the shaft and the outer ring, at lease one of the rollers being longer than the other rollers; and a cylindrical control member which controls movement of the roller bearing in the axial direction and is press-fitted and fixed to the outer surface of the shaft at a position close to an end surface of the longer roller (7) The shaft apparatus according to (6), wherein the control member includes a cylindrical portion press-fitted and fixed to the outer surface of the shaft and a flange portion protruding from an outer surface of an end portion of the cylindrical portion in an annular shape, and an outer diameter of the flange portion is smaller than an outer diameter of the outer ring of the roller bearing.

(8) The shaft apparatus according to (6), wherein the control member is made of a material having lower hardness than the shaft.

(9) A bearing apparatus for comprising:

a camshaft;

a plurality of cam blocks disposed in an axial direction on the camshaft;

a housing member including an arc concave portion;

a cap member which is fixed to the housing and includes an arc concave portion;

a roller bearing interposed between the arc concave portion of the housing member and the arc concave portion of the cap member so as to rotatably support the camshaft; and annular first and second control rings which are separately provided from the camshaft, and are press-fitted and fixed to an outer surface of the camshaft at opposite side portions of the roller bearing in the axial direction, wherein surfaces of the first and second rings that face each other are formed as slide surfaces, and the slide surfaces come in contact with opposite side surfaces of at least one of the housing member and the cap member to receive an axial load.

With the arrangement (1), in the shaft apparatus, the blocks and the inner ring of the roller bearing are fitted (press-fitted) to the outer surface of the shaft with predetermined exposed threads.

As described above, due to the structure in which the inner ring of the roller bearing which is separated from the shaft is fitted and fixed to the outer surface of the shaft with the predetermined exposed thread, unlike an existing roller bearing using a portion of the outer surface of a shaft as an inner ring raceway surface, a problem with marks generated by press-fitting a cam block to an inner ring raceway surface can be solved.

Accordingly, unlike a related art, performing a surface treatment such as a heat treatment on the outer surface of the shaft and fitting the roller bearing and the cam block thereto by performing the cold fitting, are not needed. Therefore, significant cost reduction can be achieved.

In addition, as compared with a ball bearing, the outer ring of the roller bearing may be easily and unpredictably moved with respect to the inner ring. However, in the shaft apparatus, the movement of the outer ring can be controlled by the first and second control rings disposed between the shaft and the outer ring, so that a problem in that the outer ring is unpredictably moved and deviates from the inner ring can be prevented.

Accordingly, management such as transfer, maintenance, and the like of the shaft apparatus is easy, and mounting the shaft apparatus at a predetermined position is also easy.

With the arrangement (2), since at least one of the control rings is formed integrally with the end portion of the inner or outer ring of the roller bearing, the number of components and mounting processes can be reduced, and cost reduction can be achieved.

With the arrangement (3), the end surface of the roller bearing comes in contact with the end surface of the control member press-fitted and fixed to the outer surface of the shaft, so that unpredictable movement of the roller bearing in the axial direction can be prevented. Consequently, the camshaft apparatus can be easily mounted to a housing such as the cylinder head portion.

In addition, during the bearing rotation, the curved end surfaces of the control member and the roller bearing come in contact with each other, so that sliding resistance (friction) between the control member and the roller bearing can be reduced.

With the arrangement (4), the end surface of the outer ring of the roller bearing comes in contact with the end surface of the control member press-fitted or fixed to the outer surface of the shaft, so that unpredictable movement of the roller bearing in the axial direction can be prevented.

With the arrangement (5), the end surface of the cage of the roller bearing comes in contact with the end surface of the control member press-fitted or fixed to the outer surface of the shaft, so that unpredictable movement of the roller bearing in the axial direction can be prevented.

In this case, by setting an outer diameter of the control member to be smaller than an inner diameter of the end portion of the outer ring of the roller bearing, a compact and light-weight control member can be implemented.

Moreover, when the shaft apparatus is mounted to a housing such as a cylinder head portion by tightly binding a pressing cover, the outer surface of the control member can be easily prevented from contacting the pressing cover, so that a difficulty in mounting the shaft apparatus does not occur.

With the arrangement (6), the end surface of the longer roller among the rollers of the roller bearing comes in contact with the cylindrical control member press-fitted and fixed to the outer surface of the shaft, so that unpredictable movement of the roller bearing in the axial direction can be prevented. Accordingly, the camshaft apparatus can be easily mounted to a housing such as a cylinder head portion.

In addition, during the bearing rotation, the cylindrical control member comes in contact with the end surface of the longer roller, so that the control member can be prevented from contacting end surfaces of the other rollers or the outer ring.

Accordingly, sliding resistance (friction) between the cylindrical control member and the roller bearing can be reduced.

With the arrangement (7), when the cylindrical portion of the control member is press-fitted to a predetermined position on the outer surface of the shaft, the flange portion of the control member is pressed in the axial direction by a press-fit tool, so that the control member can be easily press-fitted and fixed at a predetermined position on the outer surface of the shaft.

In addition, since the outer diameter of the flange portion of the control member is set to be smaller than the outer diameter of the outer ring of the roller bearing, when the camshaft apparatus is mounted to the housing such as the cylinder head portion by tightly binding a pressing cover, an outer surface of the flange portion of the control member is prevented from contacting the pressing cover, so that a difficulty in mounting the camshaft apparatus does not occur.

With the arrangement (8), when the control member is press-fitted at a predetermined position on the outer surface of the shaft, press-fitting marks generated by press-fitting the control member to the outer surface of the shaft can be prevented. Accordingly, bearing performance of the roller bearing using the outer surface of the shaft as the inner ring raceway surface can be guaranteed.

With the arrangement (9), when the first and second control rings and the roller bearing which are separately provided from the camshaft are disposed on the outer surface of the camshaft at required positions, the first control is first press-fitted through an axial end of the camshaft, the roller bearing is then fitted, and the second control ring is last press-fitted.

Accordingly, the roller bearing and the first and second control rings can be easily disposed on the outer surface of the camshaft.

In addition, the roller bearing is disposed at the arc concave portion of the housing member on the camshaft so as to enable the housing member and the cap member to be tightened, so that the camshaft can be rotatably mounted with the roller bearing interposed between the arc concave portions of the housing member and the cap member.

In a state where the camshaft is assembled, the slide surfaces of the first and second control rings on the camshaft facing each other are disposed at positions close to the both side surfaces of at least one of the housing member and the cap member.

In addition, when the camshaft having the outer surface on which the roller bearing and the first and second control rings are disposed is transferred or mounted to the housing member, excessive movement of the roller bearing of the camshaft in the axial direction can be restricted by the first and second control rings. Accordingly, the camshaft can be easily mounted to the housing member.

In addition, in the state where the camshaft is assembled, the both slide surfaces of the first and second control rings come in contact with the both side surfaces of at least one of the housing member and cap member to receive an axial load.

As described above, due to the simple structure in which the roller bearing and the first and second control rings are fitted and mounted to the camshaft through the axial end in a predetermined order, the camshaft can receive the axial load. In addition, unlike a prior art, dividing the outer ring of the roller bearing into two parts, forming a crack at a cage in a circumferential direction, and forming an axially stepped portion are not needed, so that good assemblability can be obtained.

DETAILED DESCRIPTION OF PREFERRED EMBODIMENTS

Hereinafter, exemplary embodiments of the invention will be described.

First Embodiment

A first embodiment of the invention will be described with reference to FIGS. 1 and 2.

Figure 1:
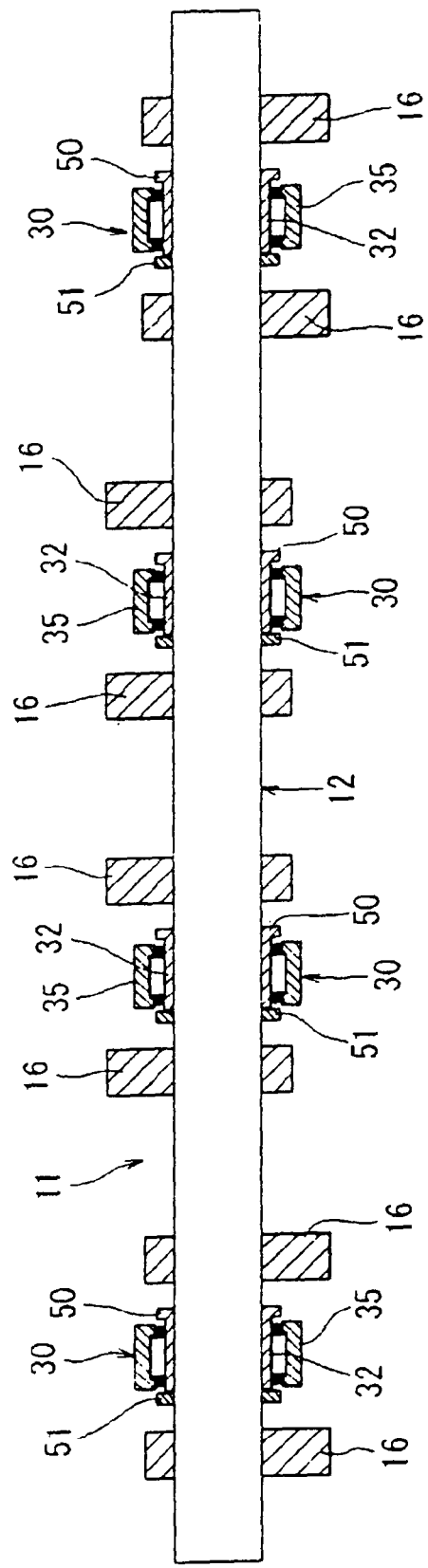
FIG. 1 is a longitudinal sectional view illustrating a camshaft apparatus with a bearing according to a first embodiment of the invention.

FIG. 1 is a longitudinal sectional view illustrating a camshaft apparatus with a bearing according to the first embodiment of the invention. FIG. 2 is an enlarged longitudinal sectional view illustrating cam blocks and a roller bearing which are disposed on an outer surface of a shaft of the camshaft apparatus in an axial direction thereof.

As illustrated in FIG. 1, according to the first embodiment, the camshaft apparatus 11 (referred to as camshaft unit) mounted to a cylinder head portion of an internal combustion engine is exemplified as a shaft apparatus.

The camshaft apparatus 11 includes a shaft 12, a plurality of cam blocks 16 as blocks, and a roller bearing 30, which are unitized.

Figure 2:
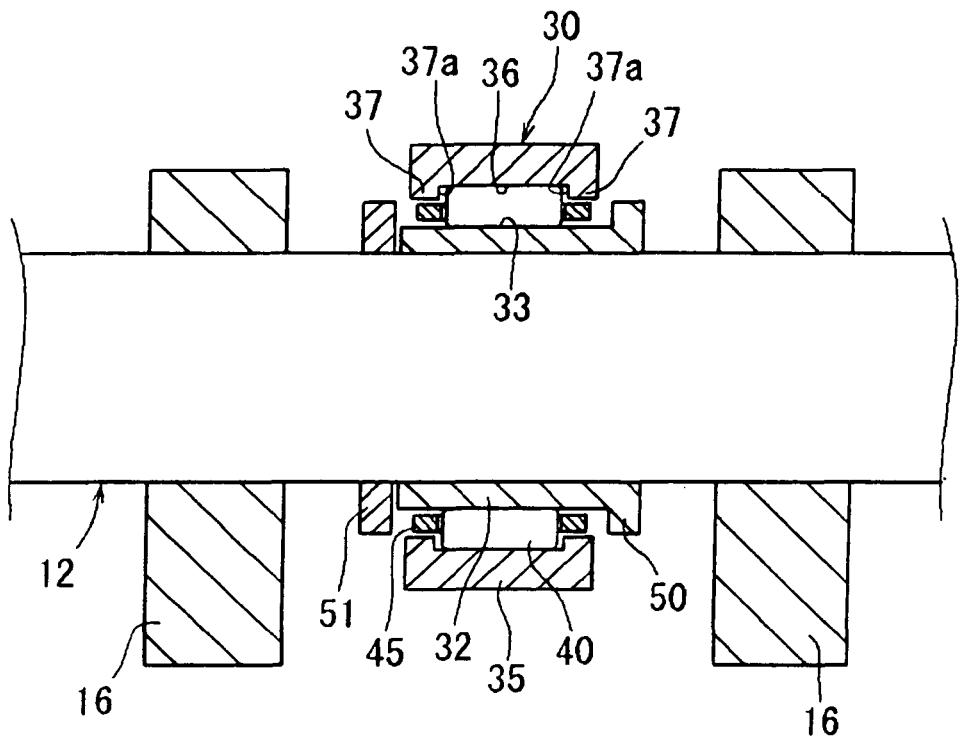
FIG. 2 is an enlarged longitudinal sectional view illustrating a roller bearing disposed on an outer surface of a shaft of the camshaft apparatus in an axial direction thereof.

In addition, as illustrated in FIG. 2, the roller bearing 30 includes an inner ring 32, an outer ring 35, a plurality of rollers 40 interposed between the inner and outer rings 32 and 35 to roll, and a cage 45 for retaining the rollers 40.

According to the first embodiment, collars 37 protrude from both side portions of a raceway surface 36 formed at an inner surface of the outer ring 35 toward the center of the shaft 12 in an annular shape, and at inner surfaces of the collars 37 facing each other, guide ways 37a for guiding both end surfaces of the rollers 40 to slide are formed.

As illustrated in FIG. 1, the plurality of cam blocks 16 and the inner ring 32 of the roller bearing 30 are sequentially fitted to the outer surface of the shaft 12 in the axial direction thereof at predetermined intervals.

In addition, inner diameters (diameters of inner holes) of the plurality of cam blocks 16 and an inner diameter of the inner ring 32 of the roller bearing 30 are set to be smaller than an outer diameter of the shaft 12 so as to enable the cam blocks 16 and the roller bearing 30 to be fitted (press-fitted) and fixed to the shaft 12 with exposed threads required with respect to the shaft 12.

As illustrated in FIG. 2, first and second control rings 50 and 51 for controlling the movement of the outer ring 35 in the axial direction of the shaft 12 are disposed between the shaft 12 and the outer ring 35 to prevent the deviation of the outer ring 35.

According to the first embodiment, the first control ring 50 is formed by performing a bending process on an end portion of the inner ring 32 of the roller bearing 30 at a right angle, that is, in a radial direction so as to be formed integrally with the end portion of the inner ring 32 in an annular shape.

The second control ring 51 is composed of a ring-shaped metal plate, and an inner diameter of the second control ring 51 is set to be smaller than the outer diameter of the shaft 12 so as to enable the second control ring 51 to be fitted (press-fitted) and fixed to the shaft 12 with an exposed thread required with respect to the shaft 12.

In addition, the second control ring 51 is fitted and fixed at a predetermined position on the outer surface of the shaft 12.

In addition, outer diameters of the first and second control rings 50 and 51 are set to be larger than an outer diameter of the cage 45.

In the camshaft apparatus 11 having the aforementioned construction according to the first embodiment, the plurality of cam blocks 16, the inner ring 32 of the roller bearing 30, and the second control ring 51 are disposed on the outer surface of the shaft 12 at predetermined intervals in a predetermined order and fitted (press-fitted) and fixed thereto with predetermined exposed threads, thereby constituting the camshaft apparatus 11.

As described above, due to the structure in which the inner ring 32 of the roller bearing 30 which is separated from the shaft 12 is fitted and fixed to the outer surface of the shaft 12 with the predetermined exposed thread, unlike an existing roller bearing using a portion of an outer surface of a shaft as an inner ring raceway surface, a problem with marks generated by press-fitting the cam block 16 to the raceway surface 33 of the outer surface of the inner ring 32 can be solved.

Accordingly, unlike a prior art, performing a surface treatment such as the heat treatment on the outer surface of the shaft 12 and fitting the roller bearing 30 and the cam block 16 thereto by performing the cold fitting, are not needed. Therefore, significant cost reduction can be achieved.

In addition, in the camshaft apparatus 11 having the aforementioned construction, the movement of the outer ring 35 of the roller bearing 30 in the axial direction can be controlled by the first and second control rings 50 and 51. Specifically, when the outer ring 35 is moved in the axial direction, an end portion of the cage 45 comes in contact with the first or second control ring 50 or 51, and an end surface of the roller 40 comes in contact with the collar 37 of the outer ring 35 at the corresponding side, so that the movement of the outer ring 35 in the axial direction can be controlled.

Accordingly, a problem in that the outer ring 35 is unpredictably moved in the axial direction and deviates from the inner ring 32 can be prevented.

In addition, since the outer ring 35 is prevented from deviating, management such as transfer, maintenance, and the like of the camshaft apparatus 11 is easy, and mounting the camshaft apparatus 11 to a predetermined position is also easy.

In addition, according to the first embodiment, since the first control ring 50 is formed integrally with the end portion of the inner ring 32 of the roller bearing 30, the number of components and mounting processes can be reduced, and cost reduction can be achieved.

Second Embodiment

Next, a second embodiment of the invention will be described with reference to FIG. 3.

Figure 3:
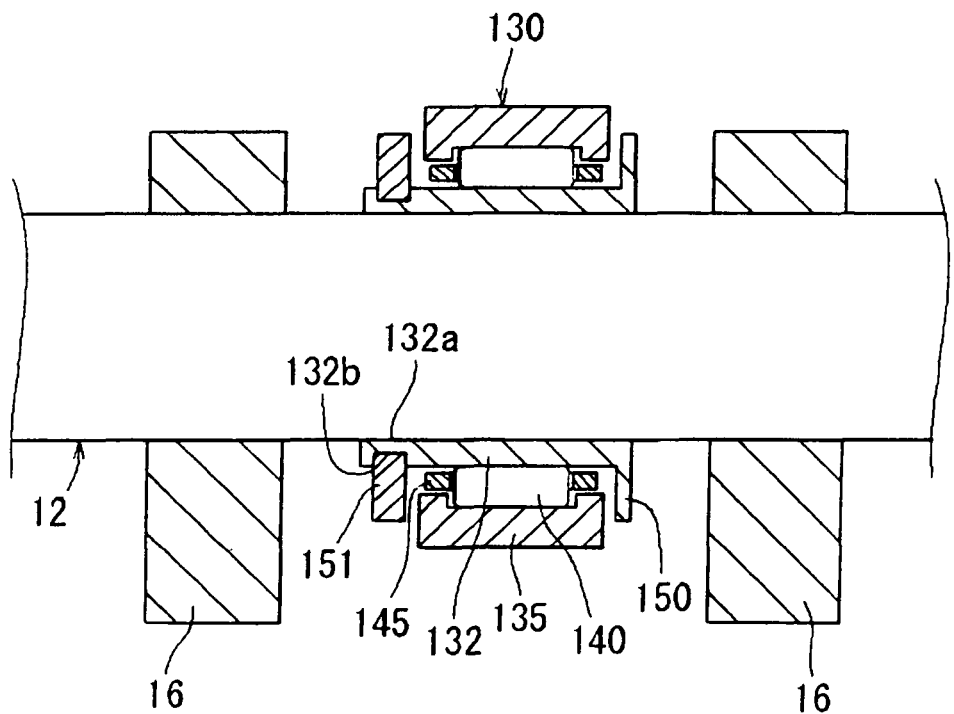
FIG. 3 is an enlarged longitudinal sectional view illustrating a roller bearing disposed on an outer surface of a shaft of a camshaft apparatus in an axial direction thereof according to a second embodiment of the invention.

FIG. 3 is an enlarged longitudinal sectional view illustrating cam blocks and a roller bearing which are disposed on an outer surface of a shaft of a camshaft apparatus in an axial direction thereof according to the second embodiment of the invention.

As illustrated in FIG. 3, according to the second embodiment, a plurality of cam blocks 16 and a roller bearing 130 are disposed on an outer surface of a shaft 12, and the roller bearing 130 includes an inner ring 132, an outer ring 135, rollers 140, and a cage 145.

According to the second embodiment, a first control ring 150 is formed integrally with an end portion of the inner ring 132 as in the first embodiment, and an extended cylindrical portion 132a for fixing a second control ring 151 is formed at the other end portion of the inner ring 132. An annular groove 132b is concavely formed at an outer surface of the extended cylindrical portion 132a, and the second control ring 151 that has a C-ring shape and can be elastically extended is elastically fitted and fixed to the annular groove 132b.

Outer diameters of the first and second control rings 150 and 151 are set to be larger than an inner diameter of the outer ring 135.

Since other components in the second embodiment are the same as those in the first embodiment, a detailed description thereof is omitted.

Therefore, according to the second embodiment, the same effects as in the first embodiment can be obtained.

However, according to the second embodiment, when the outer ring 135 is moved in the axial direction of the shaft 12, an end of the outer ring 135 or an end of the cage 145 comes in contact with the first or second ring 150 or 151, so that the movement of the outer ring 135 in the axial direction can be controlled.

Third Embodiment

Next, a third embodiment of the invention will be described with reference to FIG. 4.

Figure 4:
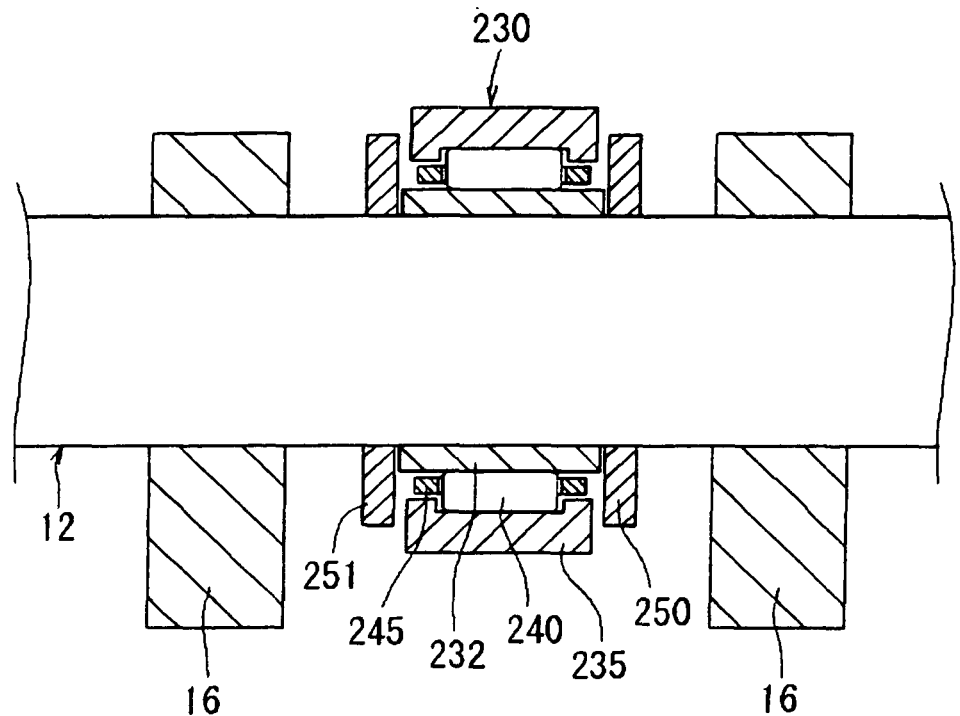
FIG. 4 is an enlarged longitudinal sectional view illustrating a roller bearing disposed on an outer surface of a shaft of a camshaft apparatus in an axial direction thereof according to a third embodiment of the invention.

FIG. 4 is an enlarged longitudinal sectional view illustrating cam blocks and a roller bearing which are disposed on an outer surface of a shaft of a camshaft apparatus in an axial direction thereof according to the third embodiment of the invention.

As illustrated in FIG. 4, according to the third embodiment, a plurality of cam blocks 16 and a roller bearing 230 are disposed on an outer surface of a shaft 12, and the roller bearing 230 includes an inner ring 232, an outer ring 235, rollers 240, and a cage 245.

In addition, according to the third embodiment, first and second control rings 250 and 251 are disposed at both side portions of the inner ring 232 of the roller bearing 230 which is fitted (press-fitted) and fixed to the outer surface of the shaft 12, and fitted (press-fitted) and fixed to the outer surface of the shaft 12 with predetermined exposed threads.

Outer diameters of the first and second control rings 250 and 251 are set to be at least larger than an outer diameter of the cage 245, and in FIG. 4, set to be larger than an inner diameter of the outer ring 235.

Since other components in the third embodiment are the same as those in the first embodiment, a detailed description thereof is omitted.

Therefore, according to the third embodiment, except that components used for separately constructing the first control ring 250 from the inner ring 232 and processes for mounting the first control ring 250 are needed, the same effects as in the first embodiment can be obtained.

Fourth Embodiment

Next, a fourth embodiment of the invention will be described with reference to FIG. 5.

Figure 5:
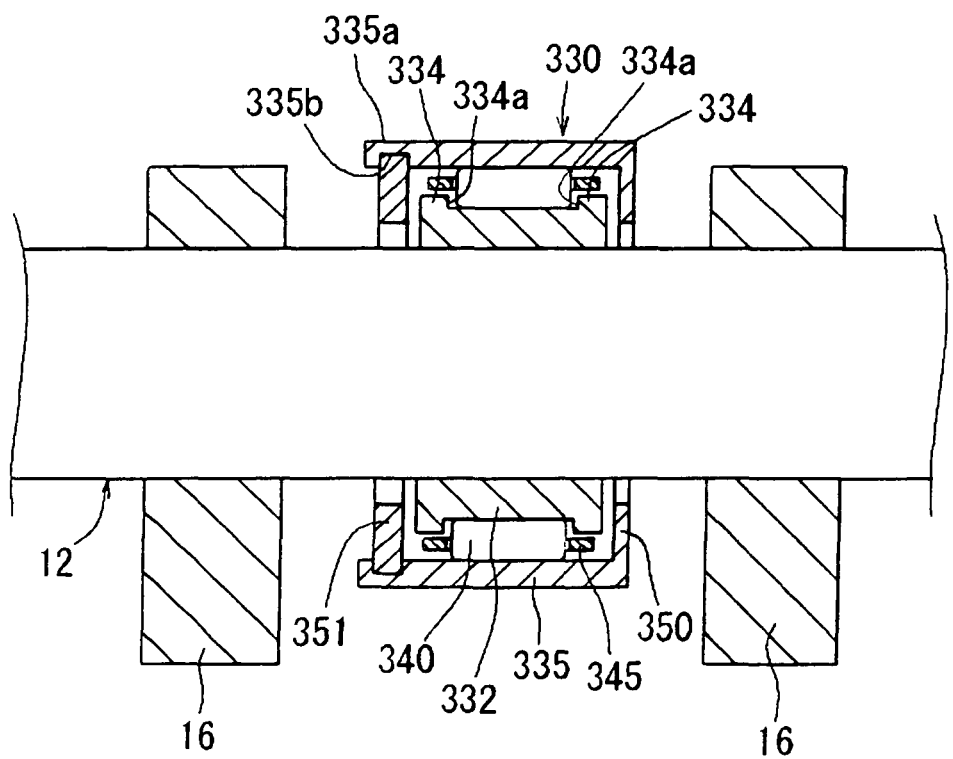
FIG. 5 is an enlarged longitudinal sectional view illustrating a roller bearing disposed on an outer surface of a shaft of a camshaft apparatus in an axial direction thereof according to a fourth embodiment of the invention.

FIG. 5 is an enlarged longitudinal sectional view illustrating cam blocks and a roller bearing which are disposed on an outer surface of a shaft of a camshaft apparatus in an axial direction thereof according to the fourth embodiment of the invention.

As illustrated in FIG. 5, according to the fourth embodiment, a plurality of cam blocks 16 and a roller bearing 330 are disposed on an outer surface of a shaft 12, and the roller bearing 330 includes an inner ring 332, an outer ring 335, rollers 340, and a cage 345.

In addition, according to the fourth embodiment, a first control ring 350 protrudes from an inner surface of an end portion of the outer ring 335 toward the center of the shaft 12 in an annular shape, and an extended cylindrical portion 335a for fixing a second control ring 351 is formed at the other end portion of the outer ring 335. In addition, an annular groove 335b is concavely formed at an inner surface of the extended cylindrical portion 335a, and the second control ring 351 having a C-ring shape is elastically reduced and inserted into the annular groove 335b.

In addition, inner diameters of the first and second control rings 350 and 351 are set to be smaller than an outer diameter of the cage 345. In FIG. 5, the inner diameters of the first and second control rings 350 and 351 are set to be smaller than an outer diameter of the inner ring 332.

Collars 334 are formed at both side portions of a raceway surface 333 of an outer surface of the inner ring 332, and guide ways 334a for guiding both end surfaces of the rollers 340 are formed at inner surfaces of the collars 334 facing each other.

Since other components in the fourth embodiment are the same as those in the first embodiment, a detailed description thereof is omitted.

Therefore, according to the fourth embodiments, the same effects as in the first embodiment can be obtained.

Here, according to the fourth embodiment, when the outer ring 335 is moved in the axial direction of the shaft 12, the first or second control ring 350 or 351 comes in contact with an end portion of the inner ring 332 or an end portion of the cage 345, so that the movement of the outer ring 335 in the axial direction can be controlled.

Fifth Embodiment

Next, a fifth embodiment of the invention will be described with reference to FIG. 6.

Figure 6:
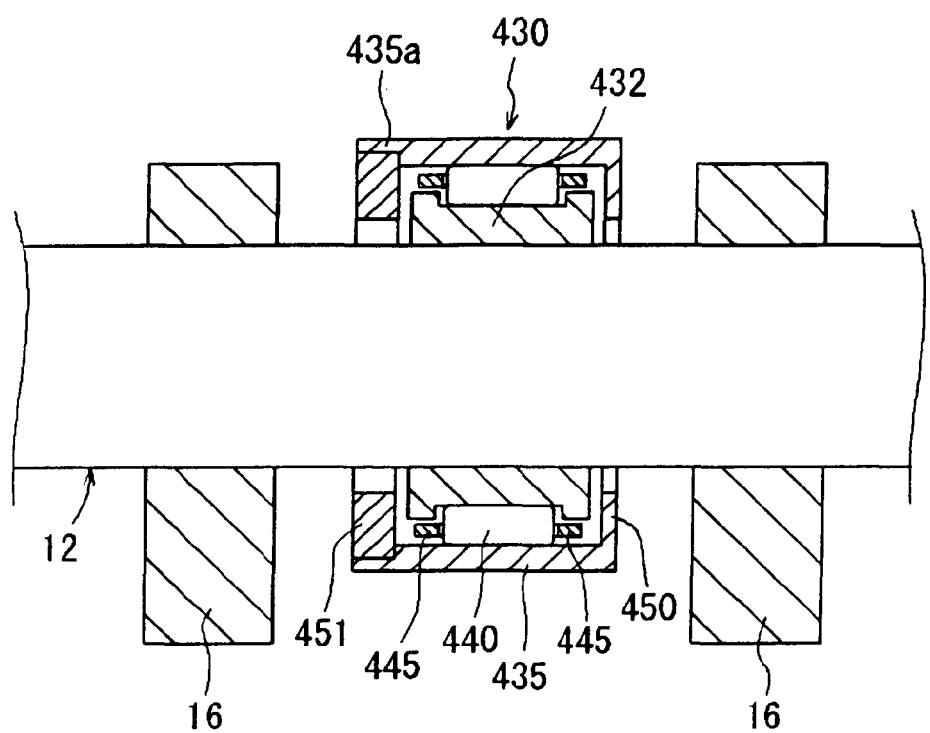
FIG. 6 is an enlarged longitudinal sectional view illustrating a roller bearing disposed on an outer surface of a shaft of a camshaft apparatus in an axial direction thereof according to a fifth embodiment of the invention.

FIG. 6 is an enlarged longitudinal sectional view illustrating cam blocks and a roller bearing which are disposed on an outer surface of a shaft of a camshaft apparatus in an axial direction thereof according to the fifth embodiment of the invention.

As illustrated in FIG. 6, according to the fifth embodiment, a plurality of cam blocks 16 and a roller bearing 430 are disposed on an outer surface of a shaft 12, and the roller bearing 430 includes an inner ring 432, an outer ring 435, rollers 440, and a cage 445.

In addition, according to the fifth embodiment, a first control ring 450 protrudes from an inner surface of an end portion of the outer ring 435 toward the center of the shaft 12 in an annular shape as in the fourth embodiment.

In addition, an extended cylindrical portion 435a for fixing a second control ring 451 is formed at the other end portion of the outer ring 435, and the annular second control ring 451 is fitted (press-fitted) to an inner surface of the extended cylindrical portion 435a with a predetermined exposed thread.

In addition, inner diameters of the first and second control rings 450 and 451 are set to be at least smaller than an outer diameter of the cage 445. In FIG. 6, the inner diameters of the first and second control rings 450 and 451 are set to be smaller than an outer diameter of the inner ring 432.

Since other components in the fifth embodiment are same as those in the fourth embodiment, a detailed description thereof is omitted.

Therefore, in the fifth embodiment, the same effects as in the fourth embodiment can be obtained.

Sixth Embodiment

A sixth embodiment of the invention is described with reference to FIGS. 7 to 9.

Figure 7:
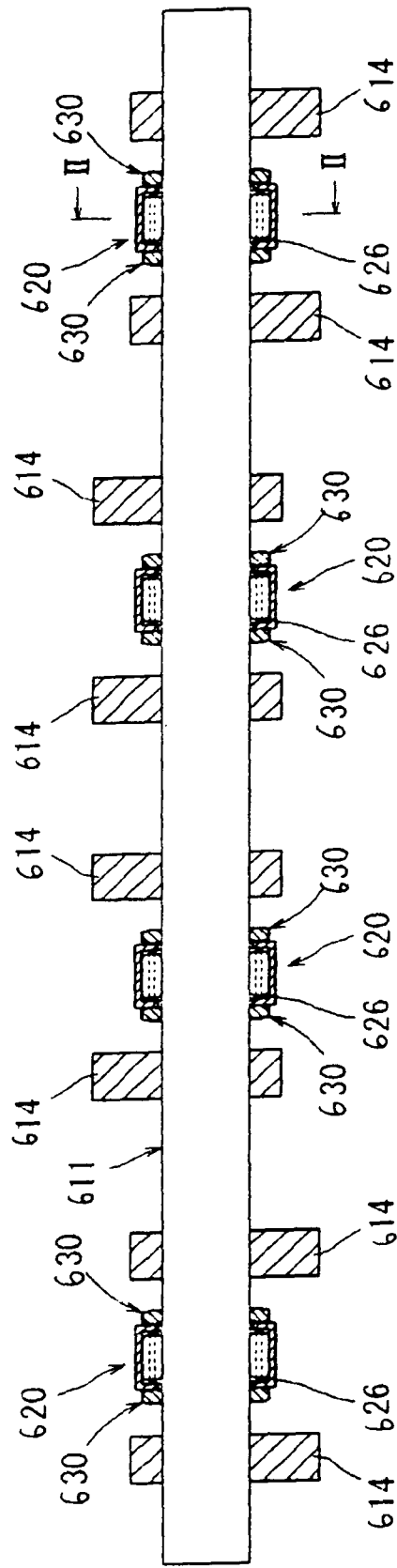
FIG. 7 is a longitudinal sectional view illustrating a camshaft apparatus with a bearing according to a sixth embodiment of the invention.

FIG. 7 is a longitudinal sectional view illustrating a camshaft apparatus with a bearing according to the sixth embodiment of the invention. FIG. 8 is a transverse sectional view taken along line II-II of FIG. 7. FIG. 9 is a longitudinal sectional view taken along line III-III of FIG. 7.

As illustrated in FIG. 7, according to the sixth embodiment, the camshaft apparatus (camshaft unit) mounted to a cylinder head portion of an internal combustion engine is exemplified as a shaft apparatus.

The camshaft apparatus includes a plurality of cam blocks 614 as blocks, a plurality of roller bearings (including shell-type needle roller bearings) 620, and a plurality of pairs of control members 630, which are disposed on an outer surface of a shaft 611 in an axial direction thereof at predetermined intervals in a predetermined order so as to be unitized.

Figure 8:
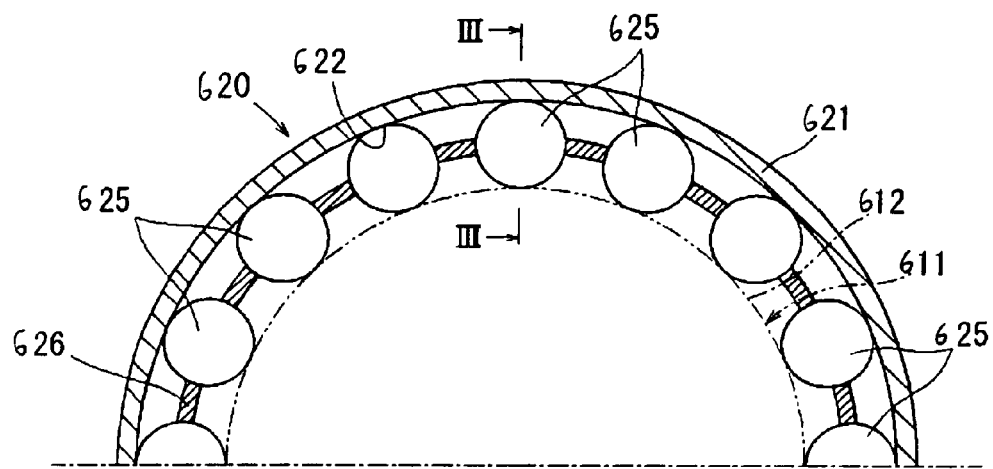
FIG. 8 is a transverse sectional view taken along line II-II of FIG. 7.
Figure 9:
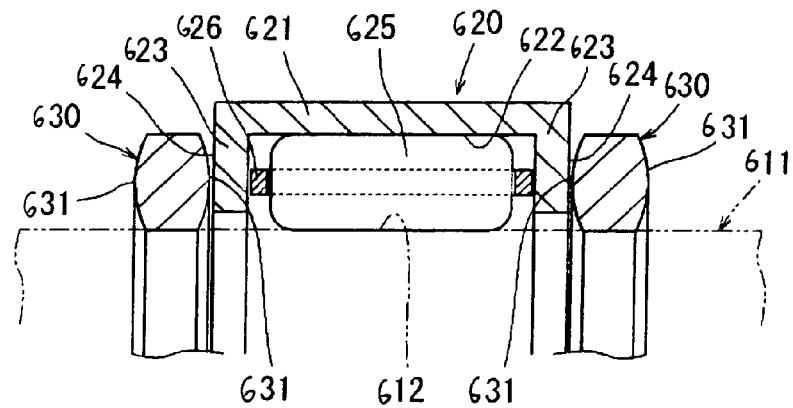
FIG. 9 is a longitudinal sectional view taken along line III-III of FIG. 8.

As illustrated in FIGS. 8 and 9, each of the roller bearings 620 includes an outer ring 621, a number of rollers (including needle rollers) 625 using the outer surface of the shaft 611 as an inner ring raceway surface 612, and a cage 626 retaining the rollers 625.

An outer ring raceway surface 622 is formed at an inner surface of the outer ring 621, and collars 623 protrude from both end portions of the outer ring 621 in a radial direction.

In addition, in a state where viscosity of a lubricant such as a grease between the outer ring raceway surface 622 of the outer ring 621 and the rollers 625 is maintained, the roller bearing 620 is fitted through an end portion of the shaft 611 at a predetermined position of the shaft 611 by using the outer surface of the shaft 611 as the inner ring raceway surface 612.

A pair of the control members 630 for controlling the movement of the roller bearing 620 in the axial direction are press-fitted and fixed to the outer surface of the shaft 611 at positions close to both end surfaces 624 of the collars 623 of the outer ring 621 of the roller bearing 620.

According to the sixth embodiment, the control member 630 is formed by performing injection molding on a resin having lower hardness than the shaft 611 composed of a steel, in an annular shape, and press-fitted and fixed to the outer surface of the shaft 611.

In addition, an outer diameter of the control member 630 is set to be smaller than an outer diameter of the outer ring 621 of the roller bearing 620.

Here, at least one of end surfaces of the control member 630 and the outer ring 621 of the roller bearing 620 which face each other, is formed as a curved surface.

According to the sixth embodiment, both end surfaces 631 of the control member 630 are formed as the same curved surfaces (including arc surfaces).

Since the both end surfaces 631 of the control member 630 are formed as the same curved surfaces, when the control member 630 is press-fitted to the outer surface of the shaft 611, the end surface 631 of the control member 630 is not restricted only in a direction, and the control member 630 can be easily press-fitted and fixed.

In other words, when the end surface 631 of the control member 630 on a side is formed as the curved surface and the end surface 631 on the other side is formed as a plane surface, in some cases, there is a problem in that the end surface 624 of the outer ring 621 may face the plane end surface on the other side and be press-fitted to the outer surface of the shaft 611. However, according to the sixth embodiment, the both end surfaces 631 of the control member 630 are formed as the same curved surfaces (including the arc surfaces), so that the aforementioned problem does not occur.

In the camshaft apparatus having the aforementioned construction according to the sixth embodiment, the cam blocks 614, the roller bearing 620, and the control member 630 are disposed in a predetermined order in a direction from an end portion to the other end portion of the outer surface of the shaft 611 in the axial direction and press-fitted and mounted to the shaft 611, thereby constituting the camshaft apparatus (see FIG. 7).

Therefore, when the control member 630 composed of the resin is press-fitted at a predetermined position on the outer surface of the shaft 611 composed of the steel, press-fitting marks generated by press-fitting the control member 630 to the outer surface of the shaft 611 can be prevented. Accordingly, bearing performance of the roller bearing 620 using the outer surface of the shaft 611 as the inner ring raceway surface 612 can be guaranteed.

In addition, in the case where the camshaft apparatus is transferred, stored, or mounted to a housing such as the cylinder head portion, when external force is exerted to the roller bearing 620 and the roller bearing 620 is moved in the axial direction of the shaft 611, the collar 623 of the outer ring 621 of the roller bearing 620 come in contact with the end surface 631 of the control member 630 press-fitted and fixed to the shaft 611. Accordingly, unpredictable movement of the roller bearing 620 in the axial direction can be prevented.

Consequently, the camshaft apparatus can be easily mounted to the housing such as the cylinder head portion.

In addition, since the outer diameter of the control member 630 is set to be smaller than the outer diameter of the outer ring 621 of the roller bearing 620, when the camshaft apparatus is mounted to the housing such as the cylinder head portion by tightly binding a pressing cover, the outer surface of the control member 630 is prevented from contacting the pressing cover, so that a difficulty in mounting the camshaft apparatus does not occur.

In addition, during the bearing rotation of the camshaft apparatus mounted to the housing such as the cylinder head portion, the curved end surface 631 of the control member 630 contacts the end surface 624 of the outer ring 621, so that sliding resistance (friction) between the end surface 631 of the control member 630 and the end surface 624 of the outer ring 621 of the roller bearing 620 can be reduced.

Seventh Embodiment

Next, a seventh embodiment of the invention will be described with reference to FIG. 10.

Figure 10:
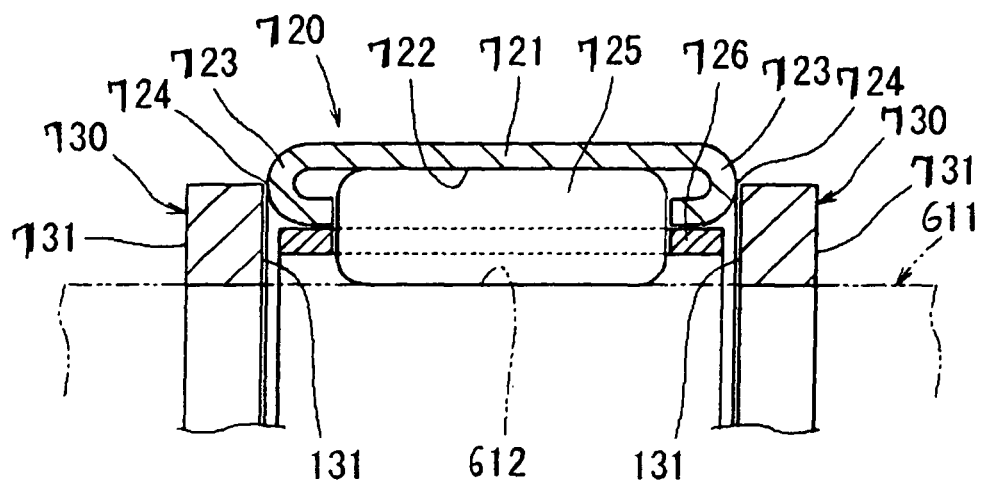
FIG. 10 is a longitudinal sectional view illustrating a roller bearing of a shaft of a camshaft apparatus and a control member thereof which are mounted to each other according to a seventh embodiment of the invention.

FIG. 10 is a longitudinal sectional view illustrating a roller bearing of a shaft of a camshaft apparatus and a control member thereof which are mounted to each other according to the seventh embodiment of the invention.

As illustrated in FIG. 10, the roller bearing 720 according to the seventh embodiment includes an outer ring (shell-type outer ring) 721, a number of rollers (including needle rollers) 725 using the outer surface of the shaft 611 as an inner ring raceway surface 612, and a cage 726 for retaining the rollers 725 to roll.

An outer ring raceway surface 722 is formed at an inner surface of the outer ring 721, and collars 723 bent into a curved shape in the radial direction are formed at both end portions of the outer ring 721.

In addition, the roller bearing 720 is fitted through an end portion of the shaft 611 at a predetermined position of the shaft 611 by using the outer surface of the shaft 611 as the inner ring raceway surface 612.

On the outer surface of the shaft 611, a pair of control members 730 for controlling the movement of the roller bearing 620 in the axial direction are press-fitted and fixed at positions close to both end surfaces (convex portions of the curved shapes) 724 of the collars 723 of the outer ring 721 of the roller bearing 720.

In addition, according to the seventh embodiment, both end surfaces 731 of the control members 730 are formed as plane surfaces.

In addition, according to the seventh embodiment, the control member 730 is formed by performing injection molding on a resin having lower hardness than the shaft 611 composed of a steel, in an annular shape as in the fifth embodiment, and press-fitted and fixed to the outer surface of the shaft 611. Moreover, an outer diameter of the control member 730 is set to be smaller than an outer diameter of the outer ring 721 of the roller bearing 720.

Since other components in the seventh embodiment are the same as those in the sixth embodiment, a detailed description thereof is omitted.

Therefore, in the seventh embodiment, the same effects as in the sixth embodiment can be obtained.

Eighth Embodiment

Next, an eighth embodiment of the invention will be described with reference to FIG. 11.

Figure 11:
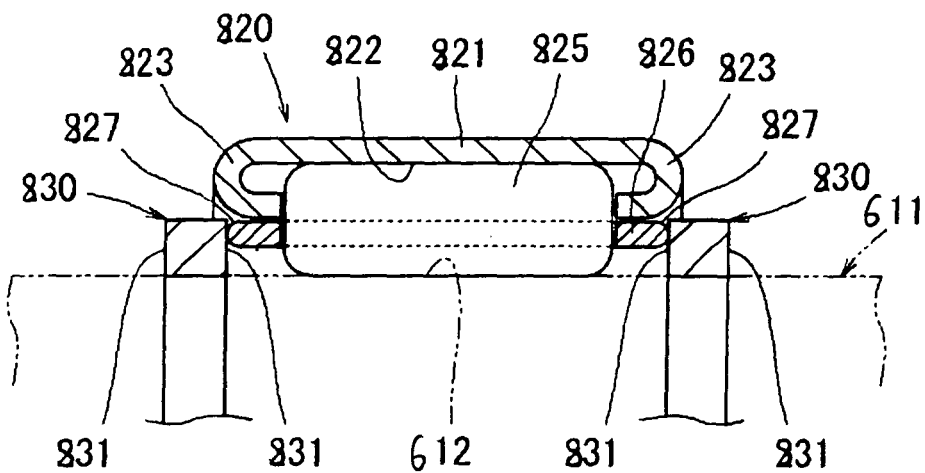
FIG. 11 is a longitudinal sectional view illustrating a roller bearing of a shaft of a camshaft apparatus and a control member thereof which are mounted to each other according to the eighth embodiment of the invention.

FIG. 11 is a longitudinal sectional view illustrating a roller bearing of a shaft of a camshaft apparatus and a control member thereof which are mounted to each other according to the eighth embodiment of the invention.

As illustrated in FIG. 11, the roller bearing 820 according to the eighth embodiment, as in the seventh embodiment, includes an outer ring 821, a number of rollers 825 using the outer surface of the shaft 611 as an inner ring raceway surface 612, and a cage 826 for retaining the rollers 825 to roll.

An outer ring raceway surface 822 is formed at an inner surface of the outer ring 821, and collars 823 bent into a curved shape in a radial direction are formed at both end portions of the outer ring 821.

In addition, the roller bearing 820 is fitted through an end portion of the shaft 611 at a predetermined position of the shaft 611 by using the outer surface of the shaft 611 as the inner ring raceway surface 612.

On the outer surface of the shaft 611, a pair of control members 830 for controlling the movement of the roller bearing 80 in the axial direction are press-fitted and fixed at positions close to both end surfaces 827 of the cage 826 of the roller bearing 820.

According to the eighth embodiment, an outer diameter of the control member 830 is set to be smaller than an inner diameter of the collar 823 of the outer ring 821 of the roller bearing 820 and simultaneously equal to an outer diameter of the cage 826.

Here, at least one of end surfaces of the control member 830 and the cage 826 of the roller bearing 820 which face each other, is formed as a curved surface.

According to the eighth embodiment, the both end surfaces 827 of the cage 826 are formed as the curved surfaces (including arc surfaces), and both end surfaces 831 of the control members 830 are formed as plane surfaces.

In addition, the control member 830 is formed by performing injection molding on a resin having lower hardness than the shaft 611 composed of a steel, in an annular shape as in the sixth or seventh embodiment, and press-fitted and fixed to the outer surface of the shaft 611.

Since other components in the eighth embodiment are the same as those in the sixth or seventh embodiment, a detailed description thereof is omitted.

Therefore, in the eighth embodiment, the same effects as in the sixth or seventh embodiment can be obtained.

Here, according to the eighth embodiment, the outer diameter of the control member 830 is set to be smaller than the inner diameter of the collar 823 of the outer ring 821 of the roller bearing 820, so that a compact and light-weight control member 830 can be implemented.

Moreover, when the camshaft apparatus is mounted to a housing such as the cylinder head portion by tightly binding a pressing cover, the outer surface of the control member 830 can be easily prevented from contacting the pressing cover even as compared with the sixth or seventh embodiment, so that a difficulty in mounting the camshaft apparatus does not occur.

The invention is not limited to the sixth to eighth embodiments and can be modified in various forms without departing from the spirit and scope of the invention.

For example, in the sixth to eighth embodiments, the control member 630 (730 and 830) composed of the resin is exemplified. However, any material having lower hardness than the shaft 611 composed of the steel may be employed. For example, the control member 630 (730 and 830) may be composed of a soft metal such as an aluminum material.

Ninth Embodiment

A ninth embodiment of the invention will be described with reference to FIGS. 12 to 15.

Figure 12:
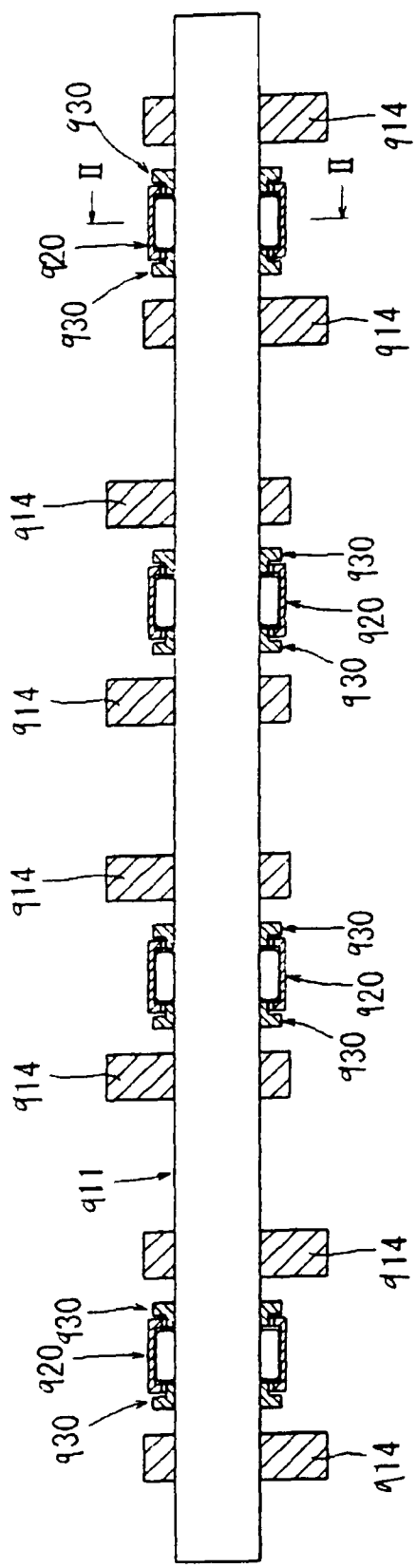
FIG. 12 is a longitudinal sectional view illustrating a camshaft apparatus with a bearing according to a ninth embodiment of the invention.
Figure 13:
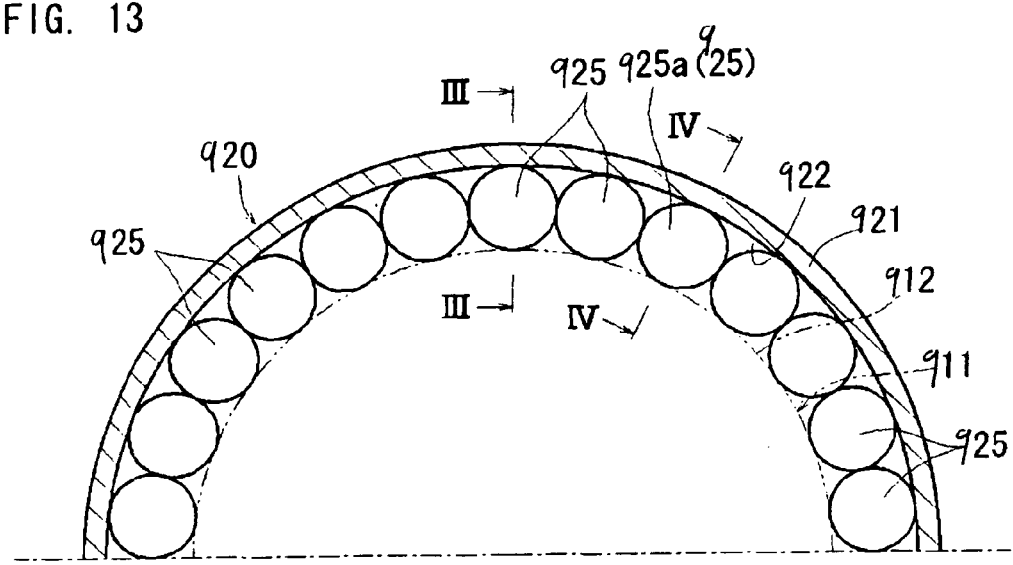
FIG. 13 is a transverse sectional view taken along line II-II of FIG. 12.
Figure 14:
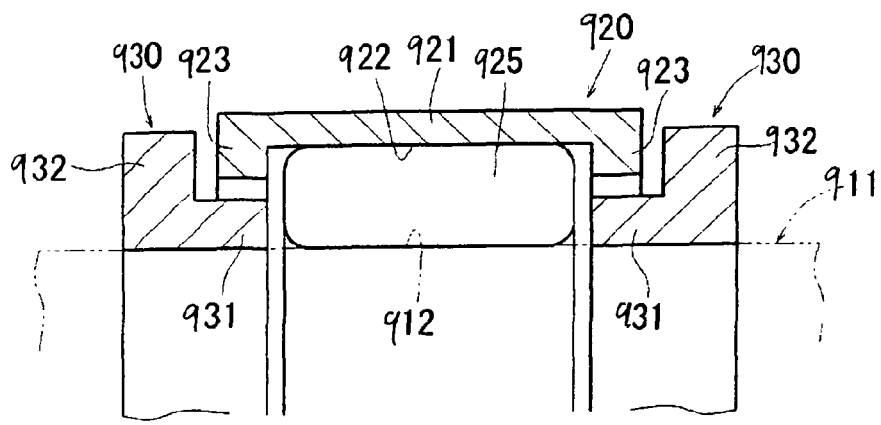
FIG. 14 is a longitudinal sectional view taken along line III-III of FIG. 13.
Figure 15:
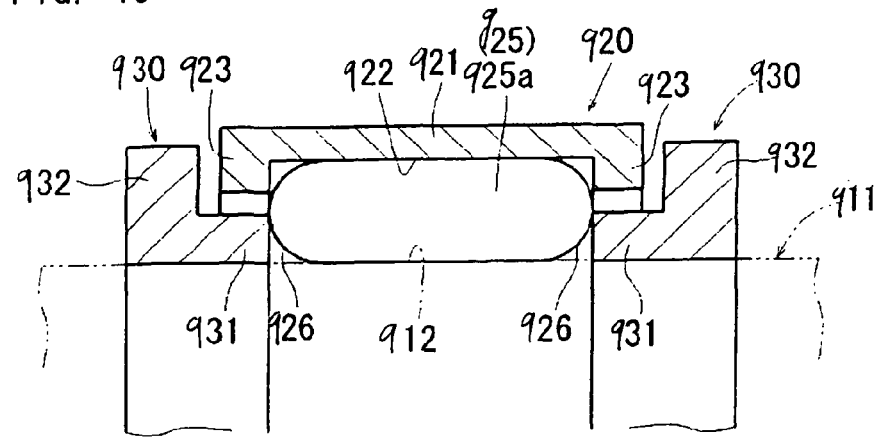
FIG. 15 is a longitudinal sectional view taken along line IV-IV of FIG. 13.

FIG. 12 is a longitudinal sectional view illustrating a camshaft apparatus with a bearing according to the ninth embodiment of the invention. FIG. 13 is a transverse sectional view taken along line II-II of FIG. 12. FIG. 14 is a longitudinal sectional view taken along line III-III of FIG. 13. FIG. 15 is a longitudinal sectional view taken along line IV-IV of FIG. 13.

As illustrated in FIG. 12, according to the ninth embodiment, the camshaft apparatus mounted to a cylinder head portion of an internal combustion engine is exemplified as a shaft apparatus.

The camshaft apparatus includes a plurality of cam blocks 914 as blocks, a plurality of roller bearings (including shell-type needle roller bearings) 920, and a plurality of pairs of control members 930, which are disposed on an outer surface of a shaft 911 in an axial direction thereof at predetermined intervals in a predetermined order so as to be unitized.

As illustrated in FIGS. 13 and 14, each of the roller bearings 920 includes an outer ring 921 and a number of rollers (including needle rollers) 925 using the outer surface of the shaft 911 as an inner ring raceway surface 912. The roller bearing 920 is any type of a roller bearing without a cage retaining the rollers 825.

An outer ring raceway surface 922 is formed at an inner surface of the outer ring 921, and collars 923 protrude from both end portions of the outer ring 921 in a radial direction in an annular shape.

At least one roller 925a of the rollers 925 disposed on the outer ring raceway surface 922 of the outer ring 921 is longer than the other rollers 925.

In addition, according to the ninth embodiment, both end surfaces 926 of the longer roller 925a are hemispherical.

In addition, a length of the longer roller 925a is substantially equal to a distance between surfaces of the both collars 923 of the outer ring 921, which face each other.

In addition, in a state where viscosity of a lubricant such as a grease between the outer ring raceway surface 922 of the outer ring 921 and the rollers (including the longer roller 925a) 925 is maintained, the roller bearing 920 is fitted through an end portion of the shaft 911 at a predetermined position of the shaft 911 by using the outer surface of the shaft 911 as the inner ring raceway surface 912.

As illustrated in FIGS. 14 and 15, on the outer surface of the shaft 911, a cylindrical control member 930 for controlling the movement of the roller bearing 920 in the axial direction is press-fitted and fixed at a position close to the both end surfaces 926 of the longer roller 925a among the rollers 925 of the roller bearing 920.

According to the ninth embodiment, the control member 930 is formed by performing injection molding on a resin having lower hardness than the shaft 911 composed of a steel, and includes a cylindrical portion 931 press-fitted and fixed to the outer surface of the shaft 911 and a flange portion 932 protruding from an outer surface of an end portion of the cylindrical portion 931 in an annular shape in one body.

An outer diameter of the flange unit 932 of the control member 930 is set to be smaller than an outer diameter of the outer ring 921 of the roller bearing 920.

In the camshaft apparatus having the aforementioned construction according to the ninth embodiment, the cam block 914, the roller bearing 920, and the control member 930 are disposed in a predetermined order in a direction from an end portion to the other end portion of the outer surface of the shaft 911 in the axial direction and press-fitted and mounted to the shaft 911, thereby constituting the camshaft apparatus (see FIG. 14).

In addition, according to the ninth embodiment, when the cylindrical portion 931 of the control member 930 is press-fitted to a predetermined position on the outer surface of the shaft 911, the flange portion 932 of the control member 930 is pressed in the axial direction by a press-fit tool, so that the control member 930 can be easily press-fitted and fixed at a predetermined position on the outer surface of the shaft 911.

According to the ninth embodiment, since the control member 930 is composed of the resin, when the control member 930 composed of the resin is press-fitted at a predetermined position on the outer surface of the shaft 811 composed of the steel, press-fitting marks generated by press-fitting the control member 930 to the outer surface of the shaft 911 can be prevented. Accordingly, bearing performance of the roller bearing 920 using the outer surface of the shaft 911 as the inner ring raceway surface 912 can be guaranteed.

In addition, in the case where the camshaft apparatus is transferred, stored, or mounted to a housing such as the cylinder head portion, when external force is exerted to the roller bearing 920 and the roller bearing 920 is moved in the axial direction of the shaft 911, the end surface 926 of the longer roller 925a comes in contact with the end surface of the cylindrical portion 931 of the control member 930 press-fitted and fixed to the shaft 911, and at the same time, the inner side surface of the collar 923 of the outer ring 921 comes in contact with the end surface 926 of the longer roller 925a. Accordingly, unpredictable movement of the roller bearing 920 in the axial direction can be prevented.

Consequently, the camshaft apparatus can be easily mounted to the housing such as the cylinder head portion.

In addition, only the longer roller 925a is forcibly contacted to the end surface of the cylindrical portion 931 of the control member 930 and the inner surface of the collar 923 of the outer ring 921, and the other rollers 925 are free in the axial direction, so that abrasion between contacting portions due to the rotary torque of the bearing can be reduced.

In addition, since the outer diameter of the flange portion 932 of the control member 930 is set to be smaller than the outer diameter of the outer ring 921 of the roller bearing 920, when the camshaft apparatus is mounted to the housing such as the cylinder head portion by tightly binding a pressing cover, an outer surface of the flange portion 932 of the control member 930 is prevented from contacting the pressing cover, so that a difficulty in mounting the camshaft apparatus is not caused.

In addition, during the bearing rotation of the camshaft apparatus mounted to the housing such as the cylinder head portion, the end surface of the cylindrical portion 931 of the control member 930 and the end surface 926 of the longer roller 925a come in contact with each other, so that the control member 930 can be prevented from contacting end surfaces of the other rollers 925 or the outer ring 921.

Accordingly, sliding resistance (friction) between the control member 930 and the roller bearing 920 can be reduced.

In addition, according to the ninth embodiment, since the end surface 926 of the longer roller 925a is hemispherical, high sliding resistance reduction effects can be achieved.

The invention is not limited to the ninth embodiment and may be modified in various forms without departing from the spirit and scope of the invention.

For example, in the ninth embodiment, the control member 930 is composed of the resin. However, any material having lower hardness than the shaft 911 composed of the steel may be employed. For example, the control member 930 may be composed of a soft metal such as an aluminum material.

In addition, in the ninth embodiment, the roller bearing without a cage is exemplified. However; a bearing using the cage may be applied.

Tenth Embodiment

A tenth embodiment of the invention will be described with reference to FIGS. 16 to 19.

Figure 16:
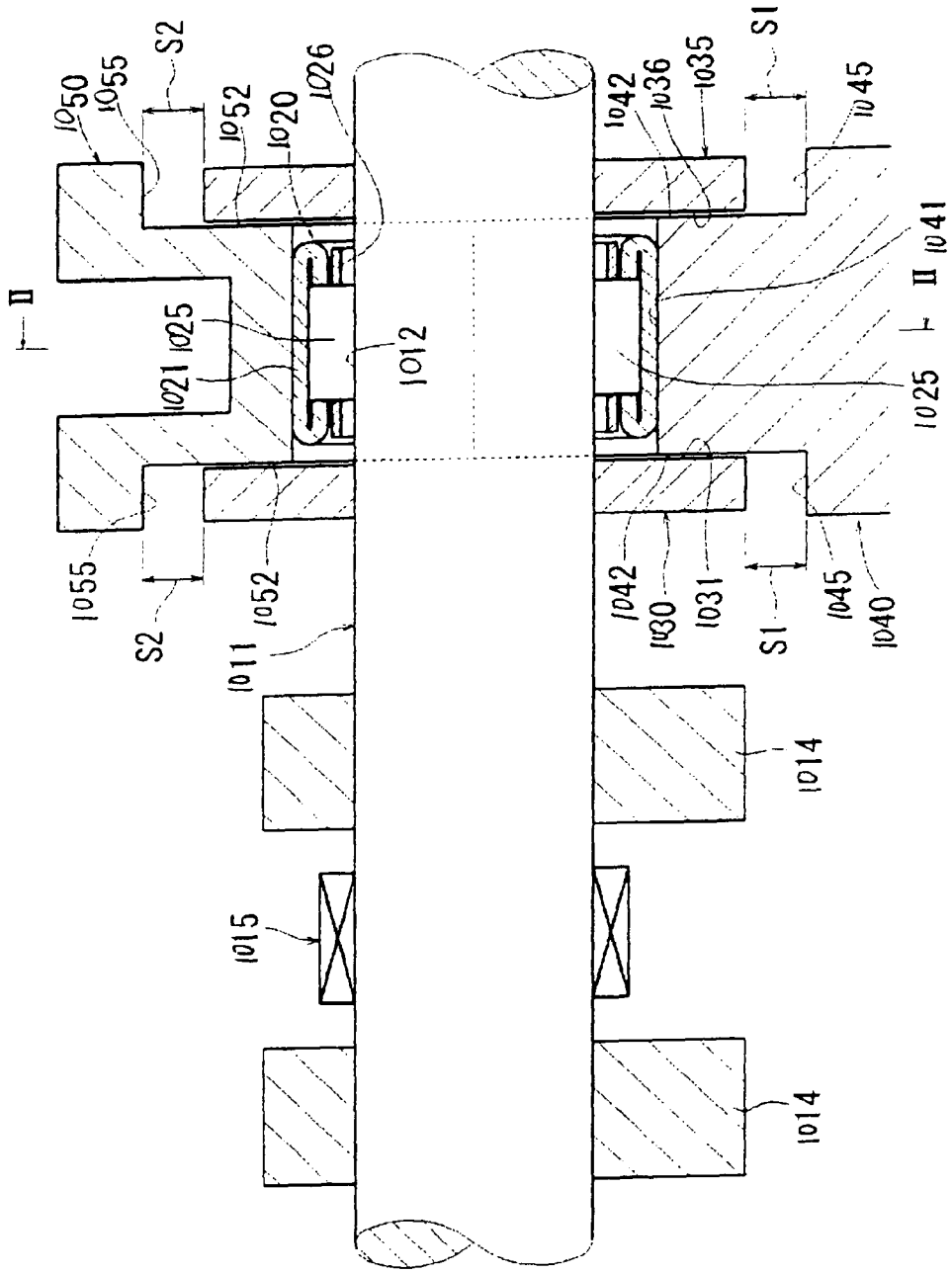
FIG. 16 is a longitudinal sectional view illustrating a bearing apparatus for a camshaft according to a tenth embodiment of the invention.
Figure 17:
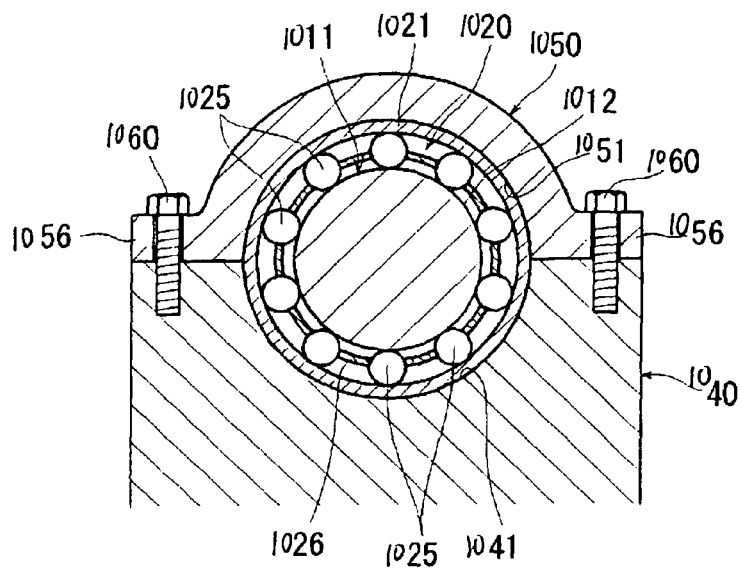
FIG. 17 is a transverse sectional view taken along line II-II of FIG. 16.
Figure 18:
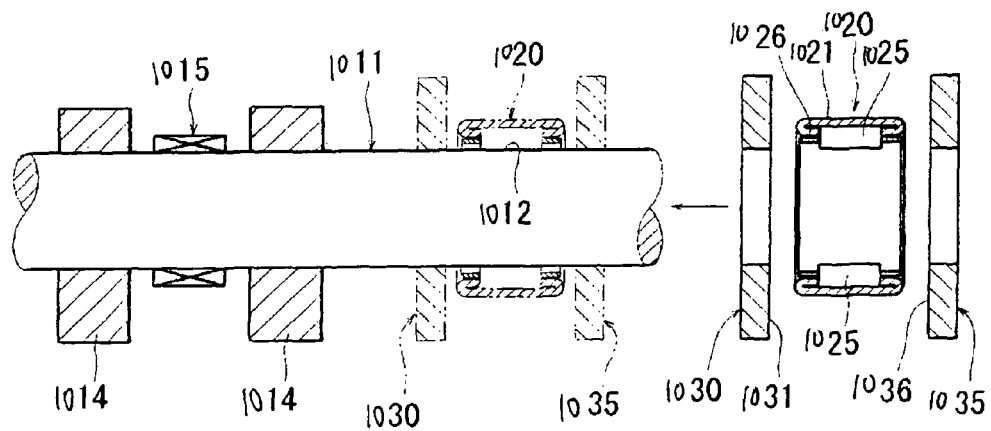
FIG. 18 is an explanatory view illustrating a state before a roller bearing and first and second control rings are mounted to a camshaft.
Figure 19:
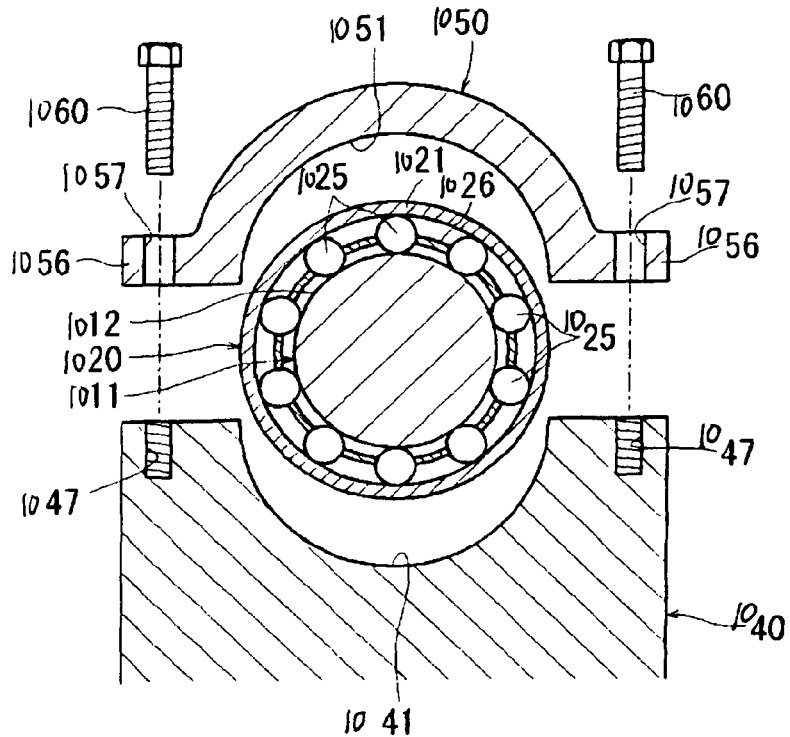
FIG. 19 is an explanatory view illustrating a state before the camshaft is mounted between a housing member and a cap member.

FIG. 16 is a longitudinal sectional view illustrating a bearing apparatus for a camshaft according to the tenth embodiment of the invention. FIG. 17 is a transverse sectional view taken along line II-II of FIG. 16. FIG. 18 is an explanatory view illustrating a state before a roller bearing and first and second control rings are mounted to the camshaft. FIG. 19 is an explanatory view illustrating a state before the camshaft is assumed between a housing member and a cap member.

As illustrated in FIGS. 16 and 17, the bearing apparatus for a camshaft includes the camshaft 1011, the roller bearing 1020, the first and second control rings 1030 and 1035, the housing member 1040, and the cap member 1050.

A plurality of cam blocks 1014 are disposed on the outer surface of the camshaft 1011 in an axial direction, and a bearing (roller bearing or sliding bearing) 1015 is disposed between the adjacent cam blocks 1014 on the outer surface of the camshaft 1011 as needed.

As illustrated in FIG. 16, the roller bearing 1020 and the first and second control rings 1030 and 1035 are mounted to an outer surface of an end gathered portion of the camshaft 11.

As illustrated in FIGS. 16 to 19, the roller bearing (including shell-type needle roller bearing) 1020 includes an outer ring 1021, a number of rollers (including needle rollers) 1025 using the outer surface of the camshaft 1011 as an inner ring raceway surface 1012, and a cage 1026 for retaining the rollers 1025.

In addition, the roller bearing 1020 is fitted through an axial end portion of the camshaft 1011 at a predetermined portion on the outer surface of the camshaft 1011.

The first and second control rings 1030 and 1035 that are separately provided from the camshaft 1011 are composed of a steel, a nonferrous metal, a resin, or the like and formed in an annular shape so as to be press-fitted and fixed to the outer surface of the camshaft 1011 at both side portions of the roller bearing 1020 in the axial direction.

In addition, a distance between surfaces of the first and second control rings 1030 and 1035 press-fitted and fixed to the outer surface of the camshaft 1011 which face each other is set to be slightly larger than a distance (or distance between both side surfaces 1052 of the cap member 1050) between both side surfaces 1042 of the housing member 1040 described later. In addition, the surfaces of the first and second control rings 1030 and 1035 facing each other serve as slide surfaces 1031 and 1036 with respect to the both side surfaces 1042 of the housing member 1040 and the both side surfaces 1052 of the cap member 1050.

In addition, the outer diameters of the first and second control rings 1030 and 1035 are set to provide gaps S1 and S2 between outer surfaces of the first and second control rings 1030 and 1035 and the housing member 1040 and the cap member 1050, respectively, through which a lubricant can be injected.

In addition, the first and second control rings 1030 and 35 may be composed of a material having lower hardness than the camshaft 1011 in order to prevent marks generated by performing press-fitting on the shaft 1011 composed of the steel.

A shaft mounting portion of a surface of the housing member 1040 of a cylinder head portion of an internal combustion engine is provided with a stepped concave arc having a center portion in the axial direction as a minor diameter and both sides as major diameters is formed. At an inner surface of the center portion, an arc concave portion 1041 formed in a half arc shape having a diameter substantially equal to an outer diameter of the outer ring 1021 of the roller bearing 1020 is formed. Between inner surfaces of shoulder portions 1045 on both sides and the outer surfaces of the first and second control rings 1030 and 1035, the gap S1 is provided.

Moreover, as illustrated in FIG. 19, interval threads 1047 to which bolts 1060 for tightening the cap member 1050 are mounted are formed at both end portions of the arc concave portion 1041 of the shaft mounting portion.

The cap member 1050 is provided with a stepped concave arc having a center portion in the axial direction as a minor diameter and both sides as major diameters, similarly to the shaft mounting portion of the housing member 1040. Here, at an inner surface of the center portion, an arc concave portion 1051 formed in a half arc shape having a diameter substantially equal to the outer diameter of the outer ring 1021 of the roller bearing 1020 is formed. Between inner surfaces of shoulder portions 1055 on both sides and the outer surfaces of the first and second control rings 1030 and 1035, the gap S2 is provided.

In addition, as illustrated in FIG. 19, attached pieces 1056 having through-holes 1057 through which the bolts 1060 at the both end portions of the arc concave portion 1051 are inserted are formed at the cap member 1050.

In the bearing apparatus for a camshaft having the aforementioned construction according to the tenth embodiment, as illustrated in FIG. 18, when the first and second control rings 1030 and 1035 and the roller bearing 1020 which are separately provided from the camshaft 1011 are disposed on the outer surface of the camshaft 1011 at required positions, the first control 1030 is first press-fitted through the axial end of the camshaft 1011, the roller bearing 1020 is then fitted, and the second control ring 1035 is last press-fitted.

In addition, on the outer surface of the camshaft 1011, a plurality of cam blocks 1014 are disposed in advance.

As described above, when the camshaft 1011 unitized with the plurality of the cam blocks 1014, the roller bearing 1020, and the first and second control rings 1030 and 1035 disposed on the outer surface of the camshaft 1011 at predetermined positions is rotatably mounted between the housing member 1040 and the cap member 1050, first, the outer ring 1021 of the roller bearing 1020 disposed on the camshaft 1011 is engaged with the arc concave portion 1041 of the housing member 1040 (see FIGS. 17 and 19).

Here, the housing member 1040 and the cap member 1050 are tightened by the bolt 1060, so that the camshaft 1011 can be rotatably mounted with the roller bearing 1020 interposed between the arc concave portions 1041 and 1051 of the housing member 1040 and the cap member 1050.

As illustrated in FIG. 17, in a state where the camshaft 1011 is assembled, the slide surfaces 1031 and 1036 of the first and second control rings 1030 and 1035 on the camshaft 1011 facing each other are disposed at positions close to the both side surfaces 1042 of the housing member 1040 and the both side surfaces 1052 of the cap member 1050.

In addition, when the camshaft 1011 unitized with the plurality of cam blocks 1014, the roller bearing 1020, and the first and second control rings 1030 and 1035 is transferred or mounted to the housing member 1040, excessive movement of the roller bearing 1020 of the camshaft 1011 in the axial direction can be restricted by the first and second control rings 1030 and 1035. Accordingly, the camshaft 1011 can be easily mounted to the housing member 1040.

In addition, during the bearing rotation of the camshaft 1011, the both slide surfaces 1031 and 1036 of the first and second control rings 1030 and 1035 come in contact with the both side surfaces 1052 of the cap member 1050 in addition to the both side surfaces 1042 of the housing member 1040 to receive an axial load.

Eleventh Embodiment

Next, an eleventh embodiment of the invention will be described with reference to FIG. 20.

Figure 20:
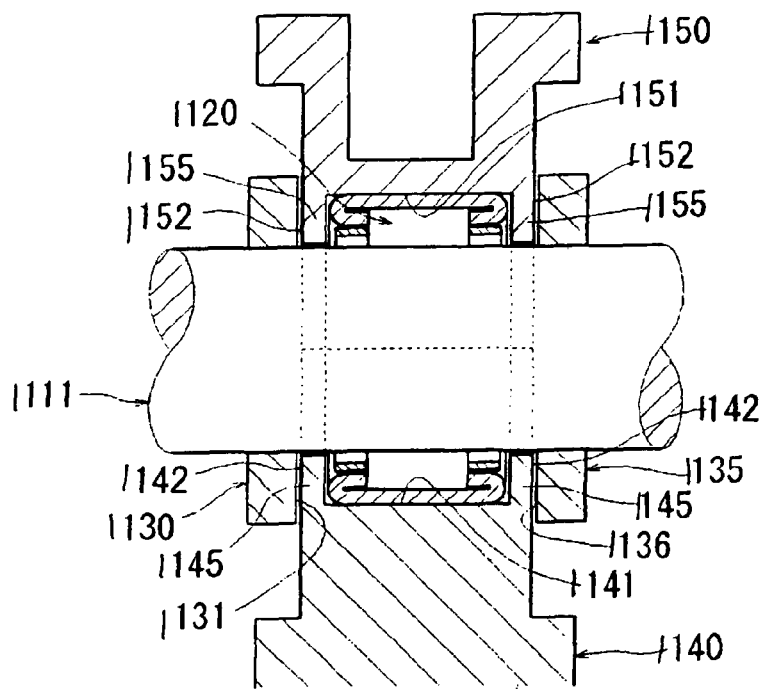
FIG. 20 is a longitudinal sectional view illustrating a bearing apparatus for a camshaft according to the eleventh embodiment of the invention.

FIG. 20 is a longitudinal sectional view illustrating a bearing apparatus for a camshaft according to the eleventh embodiment of the invention.

As illustrated in FIG. 20, according to the eleventh embodiment, annular walls 1145 protrude from both side portions of an arc concave portion 1141 formed at a center portion in the axial direction of a shaft mounting portion of a housing member 1140, toward the center of the shaft.

In addition, annular walls 1155 protrude from both side portions of an arc concave portion 1151 of a center portion in the axial direction of a cap member 1150, toward the center of the shaft.

The roller bearing 1120 and first and second control rings 1130 and 1135 are mounted to an outer surface of a camshaft 1111 as in the eleventh embodiment.

In addition, as illustrated in FIG. 20, in a state where the housing member 1140 and the camshaft 1111 are mounted to each other, slide surfaces 1131 and 1136 of the first and second control rings 1130 and 1135 on the camshaft 1111, which face each other, are disposed at positions close to side surfaces 1142 of the both annular walls 1145 of the housing member 1140 and side surfaces 1152 of the both annular walls 1155 of the cap member 1150.

Therefore, in the eleventh embodiment, the same effects as in the tenth embodiment can be obtained.

The present invention is not limited to the first to eleventh embodiments and may be modified in various formed without departing from the spirit and scope of the invention.

For example, in the first to fifth embodiments, the camshaft apparatus 11 is exemplified as the shaft apparatus. However, a bearing-attached balance shaft apparatus having a weight member as a block or a crankshaft apparatus may be exemplified.

What is claimed is:

1. A bearing apparatus comprising:
a camshaft;
a plurality of cam blocks disposed in an axial direction on the camshaft;
a housing member including an arc concave portion;
a cap member which is fixed to the housing member and includes an arc concave portion;
a roller bearing interposed between the arc concave portion of the housing member and the arc concave portion of the cap member so as to rotatably support the camshaft; and
annular first and second control rings which are separately provided from the camshaft, and are press-fitted and fixed to an outer surface of the camshaft at opposite side portions of the roller bearing in the axial direction,
wherein surfaces of the first and second control rings that face each other are formed as slide surfaces, and the slide surfaces come in contact with opposite side surfaces of at least one of the housing member and the cap member to receive an axial load.

2. The bearing apparatus according to claim 1, wherein the first and second control rings are composed of a material having lower hardness than the camshaft.

3. The bearing apparatus according to claim 1, wherein the first and second control rings are configured such that a gap, in a radial direction, is formed between at least one of the housing member and the cap member and the slide surfaces through which a lubricant can be injected.

4. The bearing apparatus according to claim 1, wherein the first and second control rings are fixed so as to rotate with the camshaft.

5. The bearing apparatus according to claim 1, wherein at least one of the housing member and the cap member includes an annular wall extending so as to overlap a portion of the first control ring and a portion of second control ring so as to form a gap in a radial direction.

6. The bearing apparatus according to claim 5, wherein an opening of the gap between the annular wall and the portion of the first control ring and the portion of the second control ring faces in the axial direction.

7. The bearing apparatus according to claim 1, wherein the housing member includes annular walls, extending in the axial direction, which overlap a portion of the first control ring and a portion of the second control ring and the cap member includes annular walls, extending in the axial direction, which overlap an other portion of the first control ring and an other portion of the second control ring.

8. The bearing apparatus according to claim 1, wherein the first and second control rings extend radially outward of the roller bearing.

* * * * *